US008045558B2

(12) United States Patent
Droms et al.

(10) Patent No.: US 8,045,558 B2
(45) Date of Patent: Oct. 25, 2011

(54) EXTENSIONS TO IPV6 NEIGHBOR DISCOVERY PROTOCOL FOR AUTOMATED PREFIX DELEGATION

(75) Inventors: Ralph Edward Droms, Westford, MA (US); Anthony Lee Hain, Woodinville, WA (US)

(73) Assignee: Cisco Technology, Inc., San Jose, CA (US)

( * ) Notice: Subject to any disclaimer, the term of this patent is extended or adjusted under 35 U.S.C. 154(b) by 1207 days.

(21) Appl. No.: 11/790,043

(22) Filed: Apr. 23, 2007

(65) Prior Publication Data

US 2008/0259925 A1  Oct. 23, 2008

(51) Int. Cl.
*H04L 12/56* (2006.01)
*H04L 12/28* (2006.01)
*G06F 15/173* (2006.01)

(52) U.S. Cl. .................. 370/392; 370/401; 709/238
(58) Field of Classification Search .............. 370/392, 370/401; 709/238
See application file for complete search history.

(56) References Cited

U.S. PATENT DOCUMENTS

| 6,804,720 | B1 * | 10/2004 | Vilander et al. ......... 709/229 |
| 6,925,087 | B2 * | 8/2005 | Inoue ................. 370/401 |
| 6,959,009 | B2 * | 10/2005 | Asokan et al. .......... 370/475 |
| 7,039,035 | B2 | 5/2006 | Droms et al. |
| 7,263,075 | B2 * | 8/2007 | Roh et al. ............. 370/310 |
| 7,362,756 | B2 * | 4/2008 | Choi et al. ............ 370/389 |
| 7,706,374 | B2 * | 4/2010 | Huang ................ 370/392 |
| 2001/0024443 | A1 * | 9/2001 | Alriksson et al. ........ 370/401 |
| 2002/0126642 | A1 * | 9/2002 | Shitama .............. 370/338 |
| 2003/0012179 | A1 * | 1/2003 | Yano et al. ............ 370/352 |
| 2003/0095504 | A1 * | 5/2003 | Ogier ................ 370/235 |
| 2003/0099246 | A1 * | 5/2003 | Cox et al. ............. 370/400 |
| 2004/0028061 | A1 * | 2/2004 | Sawada et al. .......... 370/401 |
| 2004/0083306 | A1 * | 4/2004 | Gloe ................. 709/245 |
| 2004/0111529 | A1 * | 6/2004 | Parmar ............... 709/245 |
| 2004/0205235 | A1 * | 10/2004 | Matsuhira ............. 709/238 |
| 2005/0041671 | A1 * | 2/2005 | Ikeda et al. .......... 370/395.52 |
| 2006/0056369 | A1 * | 3/2006 | Morishige et al. ........ 370/338 |
| 2006/0080728 | A1 * | 4/2006 | Wen et al. ............... 726/4 |
| 2006/0161661 | A1 | 7/2006 | Johnson et al. |

OTHER PUBLICATIONS

Guillaume Chelius, Eric Fleury and Laurent Toutain, No Administration Protocol (NAP) for IPv6 Router Auto-Configuration, Mar. 2005, aina, vol. 2, pp. 801-806, 19th International Conference on Advanced Information Networking and Applications (AINA'05) vol. 2 (INA,, USW,, WAMIS,, and IPv6 papers).*

U.S. Appl. No. 11/346,148, filed Feb. 1, 2006, Popoviciu et al.

(Continued)

*Primary Examiner* — Kevin Bates
*Assistant Examiner* — Robert B McAdams
(74) *Attorney, Agent, or Firm* — Leon R. Turkevich

(57) ABSTRACT

In one embodiment, a method comprises detecting, by a router, a first router advertisement message from an attachment router that provides an attachment link used by the router, the first router advertisement message specifying a first IPv6 address prefix owned by the attachment router and usable for address autoconfiguration on the attachment link. The router detects an unsolicited delegated IPv6 address prefix from the attachment router and that is available for use by the router. The router claims a second IPv6 address prefix from at least a portion of the delegated IPv6 address prefix, for use on at least one ingress link of the router.

40 Claims, 7 Drawing Sheets

OTHER PUBLICATIONS

IP Version 6 Working Group Discussion Archive—Thread Index and Messages, Re: Prefix Delegation using ICMPv6, Aug. 23-25, 2006, <http://www1.ietf.org/mail-archive/web/ipv6/current/thrd45.html>, printed Jun. 28, 2007, 166 pages.

IP Version 6 Working Group Discussion Archive—Thread Index and Messages, Re: simpler prefix delegation, Mar. 18-22, 2004, <http://www1.ietf.org/mail-archive/web/ipv6/current/thrd225.html>, printed Jun. 28, 2007, 70 pages.

Rao et al., "IPv6 Prefix Delegation using ICMPv6", <draft-rao-ipv6-prefix-delegation-00.txt>, Network Working Group, Internet Draft; Aug. 21, 2006, pp. 1-15.

Deering et al., "Internet Protocol, Version 6 (IPv6) Specification", Network Working Group, Request for Comments: 2460, Dec. 1998, pp. 1-39.

Thomson et al., "IPv6 Stateless Address Autoconfiguration", Network Working Group, Request for Comments: 2462, Dec. 1998, pp. 1-25.

Narten et al., "Neighbor Discovery for IP Version 6 (IPv6)", Network Working Group, Request for Comments: 2461, Dec. 1998, pp. 1-93.

Droms et al, "Dynamic Host Configuration Protocol for IPv6 (DHCPv6)", Network Working Group, Request for Comments: 3315, Jul. 2003, pp. 1-101.

Hinden et al., "Internet Protocol Version 6 (IPv6) Addressing Architecture", Network Working Group, Request for Comments: 3513, Apr. 2003, pp. 1-26.

Troan et al., "IPv6 Prefix Options for Dynamic Host Configuration Protocol (DHCP) version 6", Network Working Group, Request for Comments: 3633, Dec. 2003, pp. 1-19.

Miyakawa et al., "Requirements for IPv6 Prefix Delegation", Network Working Group, Request for Comments: 3769, Jun. 2004, pp. 1-6.

Cain et al., "Internet Group Management Protocol, Version 3", Network Working Group, Request for Comments: 3376, Oct. 2002, pp. 1-53.

Lutchansky, "IPv6 Router Advertisement Prefix Delegation Option", IETF Internet Draft, <draft-lutchann-ipv6-delegate-option-00.txt>, Feb. 2002, 6 pages.

* cited by examiner

EXTENSIONS TO IPV6 NEIGHBOR DISCOVERY PROTOCOL FOR AUTOMATED PREFIX DELEGATION

TECHNICAL FIELD

The present disclosure generally relates to routers delegating Internet Protocol (IP) network address prefixes to other routers.

BACKGROUND

The Internet Engineering Task Force (IETF) Request for Comments (RFC) 2461, describes a neighbor discovery protocol for IPv6 nodes that are connected on the same wired or wireless link. The RFC 2461 also specifies a router advertisement message format that enables a router to specify an address prefix to used by a host attached to the link for autonomous (stateless) address configuration; alternately, the router advertisement message can direct hosts connected to the link to utilize stateful address configuration according to Dynamic Host Configuration Protocol (DHCPv6), described for example in RFC 3315.

RFC 3633 describes IPv6 prefix delegation, where a delegating router that includes a DHCP server can delegate an address prefix to a requesting router, for example across an administrative boundary.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
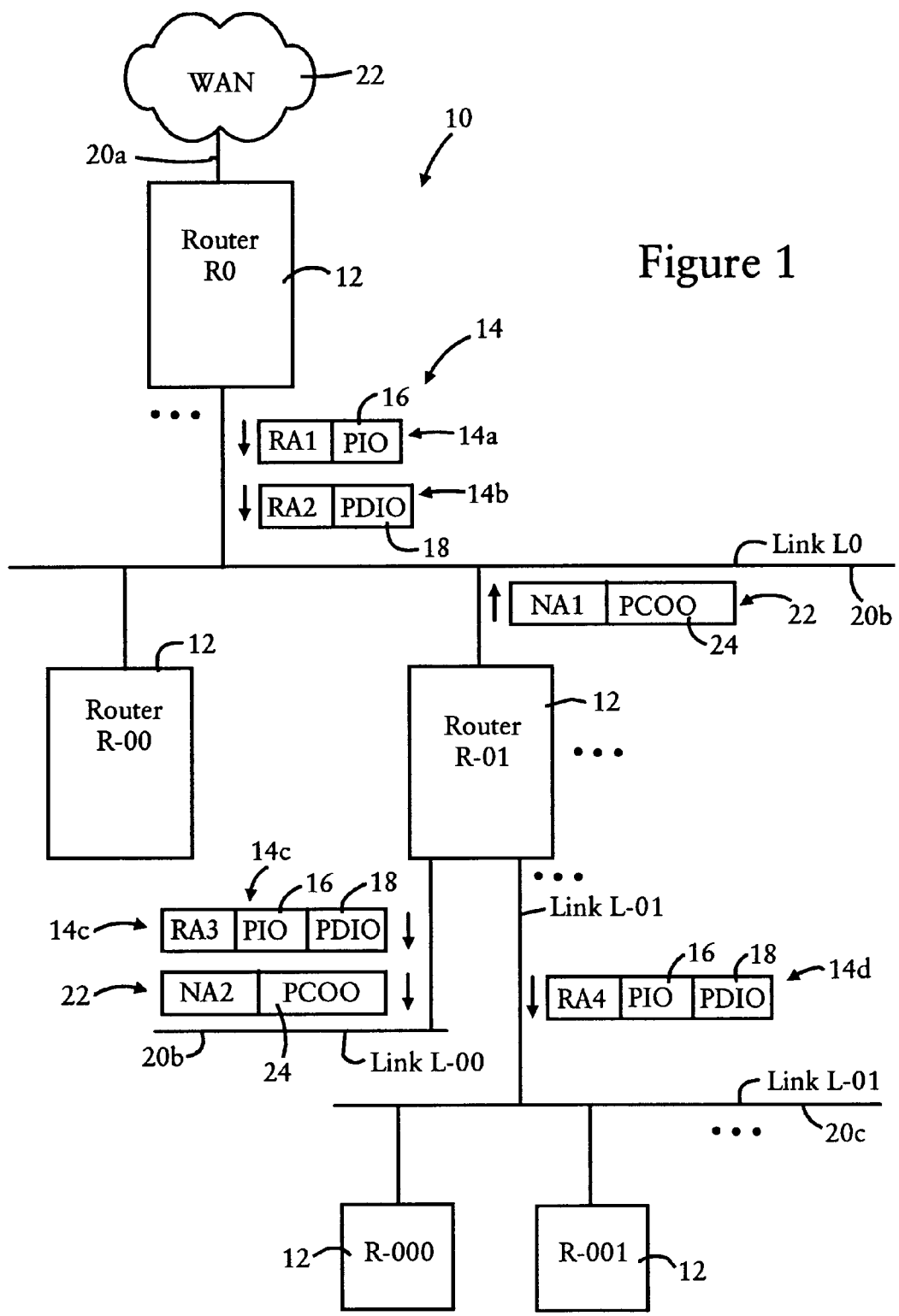
FIG. 1 illustrates an example network having routers that can execute automated prefix delegation, according to an example embodiment.

In one embodiment, a method comprises detecting, by a router, a first router advertisement message from an attachment router that provides an attachment link used by the router, the first router advertisement message specifying a first IPv6 address prefix owned by the attachment router and usable for address autoconfiguration on the attachment link. The method also comprises detecting, by the router, an unsolicited delegated IPv6 address prefix from the attachment router and that is available for use by the router. The method also comprises claiming by the router a second IPv6 address prefix from at least a portion of the delegated IPv6 address prefix, for use on at least one ingress link of the router.

In another embodiment, a method comprises generating, by a router, a router advertisement message having a prefix delegation information option field. The prefix delegation information option field specifies a delegated IPv6 address prefix having a specified prefix length, for use of at least a portion of the delegated IPv6 address prefix by attached routers that are attached to the router via an ingress link provided by the router. The method also includes outputting, by router, the router advertisement message onto the ingress link for use by the attached routers.

DETAILED DESCRIPTION

Particular embodiments extend the capabilities of routers in an Internet Protocol (IP) network, for example an IPv6 network implemented according to RFC 2460, RFC 2461, and RFC 3513. Such routers have been able to generate and output, onto a network link an unsolicited router advertisement message that specifies a prefix information option (PIO) of an IPv6 address prefix that can be used for address autoconfiguration on the network link as described in RFC 2461. However, such routers to date have relied on Dynamic Host Configuration Protocol (DHCP) with Prefix Delegation (DHCP-PD), described for example in RFC 3315, RFC 3633, and U.S. Pat. No. 7,039,035.

The particular embodiments extend the capabilities of the routers by enabling the routers to generate and output an unsolicited router advertisement that specifies a prefix delegation information option (PDIO) that specifies address prefixes that can be used by attached routers for routing operations other than address autoconfiguration on the attached link. The prefix delegation information option (PDIO) can either be attached concurrently with the existing prefix information option (PIO) as described in RFC 2461, or can be output within its own router advertisement message that does not specify any prefix information option for address autoconfiguration. Consequently, a router can autonomously assign an address prefix onto a link by outputting a router advertisement message specifying the prefix delegation information option identifying at least one delegated address prefix that is available for use by other routers attached to the link.

Hence, routers detecting the prefix delegation information option in a received router advertisement message can automatically claim a prefix from the delegated address prefix specified in the unsolicited router advertisement message. The routers claiming a prefix from the delegated address prefix also can output neighbor advertisement messages having a prefix claim/ownership option field specifying the claimed prefix to determine whether any other router has attempted to claim the prefix. Any other router that has already claimed the prefix specified in the prefix claim/ownership option field can generate and output a conflicting neighbor advertisement message asserting ownership of the claimed address prefix. Hence, routers can automatically obtain address prefixes based on claiming at least a portion of the delegated address prefix specified in the unsolicited router advertisement message, and advertise the claimed prefixes to ensure there are no conflicts with respect to the claimed prefixes.

Hence, particular embodiments enable address prefix delegation to be performed automatically in an IP network, for example by consumer-grade router in a small office-home office (SOHO) network, without the necessity of implementing stateful protocols such as Dynamic Host Configuration Protocol with Prefix Delegation (DHCP-PD) that require storage of state information for the delegated prefixes, as disclosed for example in RFC 3315, RFC 3633, and U.S. Pat. No. 7,039,035.

In addition, particular embodiments enable the advertised prefixes in the prefix delegation information option to selectively be sub-delegated, enabling recursive address prefix delegation to be performed by successive routers within a delegated address prefix. Consequently, address prefixes can be automatically assigned and distributed throughout a network (organized, for example, according to a tree topology), without manual configuration based on the routers generating and outputting unsolicited router advertisement messages specifying a delegated address prefix, where portions of the delegated address prefix can further be subdelegated based on authorized recursive prefix delegation by attached routers.

FIG. 1 is a diagram illustrating an example network 10 having routers 12 configured for autonomous prefix delegation, according to an example embodiment. Each router 12 can be configured for outputting router advertisement (RA) messages 14 onto its ingress link that serves as an attachment link (i.e., egress link) for attached routers. The term "ingress link" refers to a link that is provided by "an attachment router" for attachment by "attached routers", and the term "egress link" refers to a link that is used by "an attached router" to attach to "an attachment router". As illustrated in FIG. 1, the router "R0" 12 serves as a clusterhead for the network 10, and relies on an egress link 20a as its attachment link to the wide area network 22; the router "R0" provides an ingress link "L0" 20b that serves as an attachment link for the routers "R-00" and "R-01" 12 that have attached to the router "R0" 12 as their attachment router. Similarly, the router "R-01" which relies on its egress link 20b has its attachment link, provides its ingress link "L-00" 20b as an attachment link for other attached routers (not shown), and also provides its ingress link "L-01" 20c as an attachment link for the attached routers "R-000" and "R-001" 12. In the absence of a routing protocol, more complex topologies can be "broken down" (e.g., characterized as) a logical tree topology, even if the complex topology includes overlapping branches.

Hence, each router in a tree topology will have only one egress link that serves as "an attachment link" for the router, and one or more ingress links that can provide respective attachment links for attached routers.

Each router 12 can be configured for outputting unsolicited router advertisement messages 14 onto its ingress links. For example, the router "R0" 12 can be configured for outputting an unsolicited router advertisement message 14a onto its ingress link "L0" 20b that includes a prefix information option (PIO) 16 as specified by Section 4.2 of RFC 2461. The router "R0" also can be configured for outputting onto its ingress link "L0" 20b an unsolicited router advertisement message 14b that specifies a prefix delegation information option (PDIO) 18 that specifies a delegated IPv6 address prefix, described in further detail below with respect to FIG. 3. Hence, each router 12 (e.g., router "R0") can be configured for outputting onto its ingress link (e.g., "L0" 20b) a router advertisement message (e.g., 14a) that specifies a prefix information option 16 to be used for address autoconfiguration, plus a second unsolicited router advertisement message (e.g., 14b) that specifies a prefix delegation information option 18 that identifies an unsolicited delegated IPv6 address prefix for use by attached routers (e.g., routers "R-00" and "R-01") 12. As described in further detail below, each router (e.g., "R-01") 12 also can be configured for outputting onto its ingress interface (e.g., "L-01" 20c) a router advertisement message (e.g., 14d) that includes both the prefix information option (PIO) 16 for address autoconfiguration on the corresponding ingress link (e.g., 20c), and the prefix delegation information option (PDIO) 18 specifying a delegated IPv6 address prefix for use by the routers (e.g., "R-000" and "R-001" on the corresponding ingress link (e.g., 20c).

Each router 12 (e.g., router "R-01" 12), in response to receiving the unsolicited router advertisement message (e.g. 14b) specifying the specifying the prefix delegation information option (PDIO) 18, can respond to the unsolicited router advertisement message (e.g., 14b) by automatically claiming an IPv6 address prefix from at least a portion of the delegated IPv6 address prefix specified in the PDIO 18. The router (e.g., "R-01" 12), in response to automatically claiming an IPv6 address prefix from the delegated IPv6 address prefix specified in the PDIO 18, can output onto its attachment link (e.g., 20b) a neighbor advertisement message (e.g., "NA1") 22 that specifies a prefix claim/ownership option (PCOO) 24 identifying the claimed IPv6 address prefix. If no other router on the corresponding attachment link (e.g., router "R-00" on link "L0" 20b) contests the claim to the prefix specified in the prefix claim/ownership option (PCOO) 24 within a prescribed time interval, the router having output the neighbor advertisement message 22 changes the status of the address prefix from "claimed" to "owned" and begins using the owned prefix, including subdividing the owned prefix for use on its ingress links (e.g., "L-00" 20b and "L-01" 20c), and defending the owned prefix from other subsequent claims by other routers attached to the same attachment link (e.g., "L0" 20b).

Hence, routers can automatically obtain delegated address prefixes from received router advertisement messages specifying prefix delegation information options 18, and can claim and defend the obtained address prefixes using neighbor advertisement messages 22 specifying prefix claim/ownership options (PCOO) 24.

Figure 2:
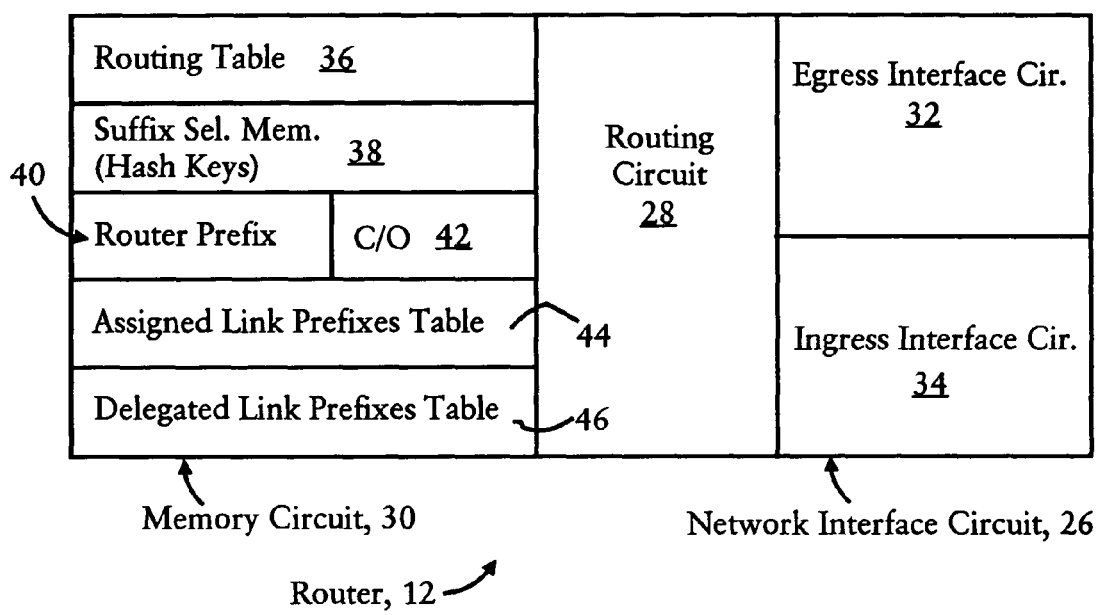
FIG. 2 illustrates an example router from the network of FIG. 1.

FIG. 2 is a diagram illustrating an example router 12 (e.g., "R-01") according to an example embodiment. The router 12 includes a network interface circuit 26, a routing circuit 28, and a memory circuit 30. The network interface circuit 26 includes an egress interface circuit 32 configured for detecting and connecting to an attachment link (e.g., "L0" 26b) provided by an attachment router (i.e., a "parent" router) (e.g., "R0"), for example in response to detecting an unsolicited router advertisement message (e.g., 14a) specifying a prefix information option field 16 that identifies a network address prefix to be used for autoconfiguration. As described below, the egress interface circuit 32 also can detect a prefix delegation information option 18 from a received router advertisement message (e.g., 14b).

The network interface circuit 26 also includes an ingress interface circuit 34 configured for providing ingress links that are used as attachment links by attached routers. The ingress interface circuit 34 also can be configured for outputting router advertisement messages (e.g., 14c, 14d) for respective ingress links (e.g., 20b, 20c). Both the egress interface circuit 32 and the ingress interface circuit 34 can be configured for outputting neighbor advertisement messages 22 on the respective egress and ingress links.

The routing circuit 28 is configured for receiving the messages from the egress interface circuit 32 and the ingress interface circuit 34, storing and reading data from the memory circuit 30, and generating the router advertisement messages 14 and neighbor advertisement messages 22 for output either by the egress interface circuit 32 or the ingress interface circuit 34, as appropriate. As described below, the routing circuit 28 can claim and defend an address prefix having been retrieved from a received router advertisement message, and can use the retrieved address prefix for use on ingress links, including outputting router advertisement messages for address autoconfiguration on ingress links, or sub-delegation of address prefixes on the ingress links based on determining that recursive delegation is authorized from the attachment router (i.e., the parent router). The routing circuit 28 also is configured for performing routing operations as known in the art, for example forwarding packets, responding to Internet Control Management Protocol (ICMP) packets, etc.

The memory circuit 30 includes a routing table memory circuit 36, a suffix selection memory circuit 38, a router prefix register circuit 40 having a claimed/ownership status field 42, an assigned link prefixes table circuit 44, and a delegated link prefixes table circuit 46. The routing table circuit 36 is configured for storing routing table entries, including reachability information for reaching identified host addresses or address prefixes, as known in the art. The suffix selection memory circuit 38 is configured for storing information on how the routing circuit 28 should select a subprefix from a delegated prefix as specified in a received prefix delegation information option 18: as described below, the suffix selection memory circuit 30 may specify a specific four-bit suffix to be appended to any received prefix, or alternately may store at least one hash key to be used in dynamically generating a suffix based on caching the received prefix with the hash key to determine the appropriate suffix to be appended to the received prefix.

The router prefix register circuit 40 is configured for storing the currently-selected address prefix to be used by the routing circuit 28; the claimed/ownership status field 42 identifies whether the currently-selected address prefix specified in the router prefix register circuit 40 is "claimed", or "owned". An address prefix is "claimed" pending a decision by the routing circuit 28 whether to establish ownership of the currently-selected address prefix, assuming no other router asserts that the currently-selected address prefix is already owned; as described below with respect to FIG. 7A, if a conflicting neighbor advertisement message 22 is received that identifies the currently-selected address prefix, and if the routing circuit 28 determines that the status field 42 identifies the currently-selected address prefix as "claimed" (i.e., not owned), the routing circuit 28 will abandon the currently-selected address prefix and attempt to select another address prefix within the delegated prefix as specified in the received prefix delegation information option 18. If, however, the routing circuit 28 determines that the status field 42 identifies the currently-selected address prefix as "owned", the routing circuit 28 will defend its currently-selected address prefix by outputting its own neighbor advertisement message 22 having a prefix claim/ownership option 24 asserting ownership of the address prefix.

The assigned link prefixes table 44 identifies, on a per-ingress link basis, the prefixes that are assigned to a given ingress link for autoconfiguration. The delegated link prefixes table 46 identifies, on a per-ingress link basis, the prefixes that are delegated to a given ingress link for recursive delegation, described below.

Although not illustrated in FIG. 2, the memory circuit 30 also can include an "abuse list" that identifies MAC addresses of attached nodes detected by the routing circuit 28 and that do not comply with the policies according to the neighbor advertisement message 22 output by the router 12, for example if an attached node is unfairly outputting a relatively large number of claims to advertised prefixes, or if the attached node is unfairly outputting a claim to a prefix that is shorter than the minimum delegation prefix length 64. In this case, the routing 28 can output an "ignore list" on its ingress interface circuit 34 to notify other attached nodes that any neighbor advertisement messages 22 from any node on the "ignore list" should be ignored; hence, a non-compliant attached node on the "ignore list" can be precluded from the arbitration of delegated prefixes among the attached nodes, in order to minimize configuration problems due to a mis-configured attached node.

Any of the disclosed circuits of the router 12 (including the network interface circuit 26, the routing circuit 28, and their associated components) can be implemented in multiple forms, including hardware logic that is implemented in a logic array such as a programmable logic array (PLA), a field programmable gate array (FPGA), or by mask programming of integrated circuits such as an application-specific integrated circuit (ASIC); any of these circuits also can be implemented using a software-based executable resource that is executed by a corresponding internal processor such as a microprocessor (not shown), where execution of executable code stored in internal nonvolatile memory (e.g., within the memory circuit 30) causes the processor to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 30 can be implemented as a non-volatile memory, for example an EPROM, a DRAM, etc.

Further, any reference to "outputting a message" or "outputting a packet" can be implemented based on to creating the message/packet in the form of a data structure and storing that data structure in a tangible memory medium in the disclosed apparatus (e.g., in a transmit buffer), and electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Figure 3:
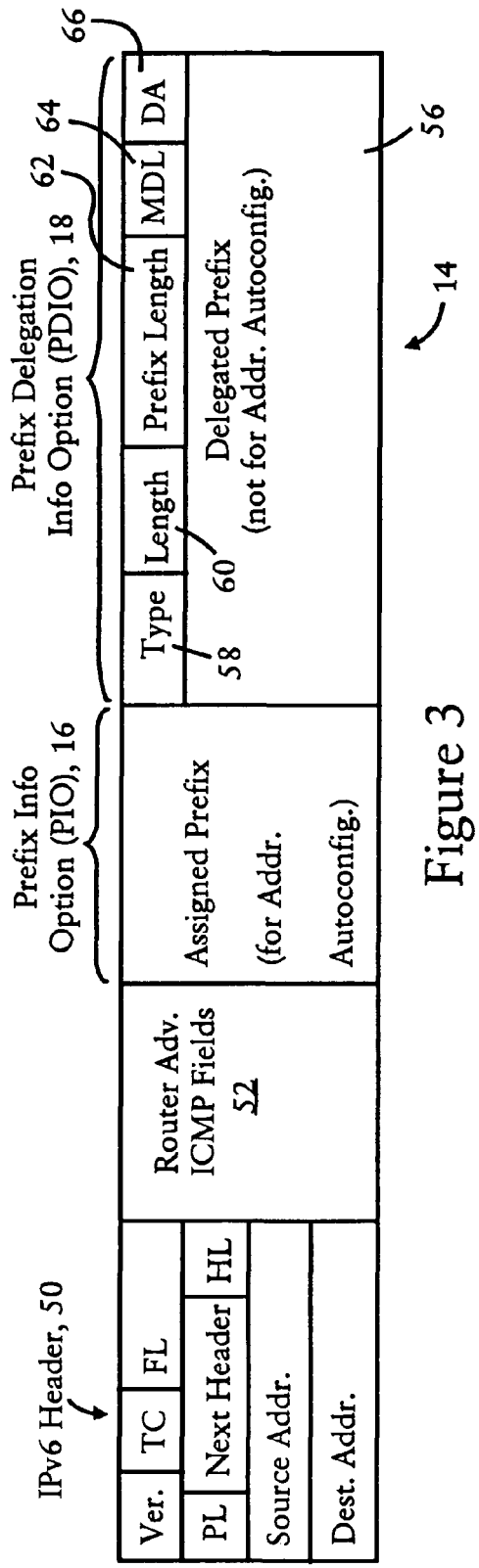
FIG. 3 illustrates an example router advertisement message generated by one of the routers of FIG. 1 and having an example prefix delegation information option specifying a delegated address prefix, according to an example embodiment.

FIG. 3 is a diagram illustrating an example neighbor advertisement message 14 generated by the routing circuit 28 according to an example embodiment. The neighbor advertisement message 14 can include an IPv6 header 50 according to RFC 2460, a router advertisement message header 52, a prefix information option 16, and a prefix delegation information option 18. If preferred, the prefix information option 16 can be omitted, such that the options 16 and 18 can be sent separately in distinct router advertisement messages.

The router advertisement message header 52 includes ICMP fields as specified in section 4.2 of RFC 2461. The prefix information option 16 specifies the assigned prefix for autonomous address autoconfiguration, as described in section 4.2 of RFC 2461.

The prefix delegation information option (PDIO) 18 specifies a delegated IPv6 address prefix and can also specify a type field 58, a option length field 60, a prefix length field 62, a minimum required delegation prefix length (MDL) field 64, and a delegation authorization identifier 66. The type field 58 identifies the prefix delegation information option (PDIO) 18 to ensure that the specified delegated prefix 56 is used for IPv6 address prefix delegation, and not autonomous address configuration; in other words, the type field 58 uniquely identifies the option 18 to ensure that the option 18 is not confused with the existing prefix information option 16 that is used for address autoconfiguration. The length field 60 specifies the length of the option 18, and the prefix length field 62 identifies the length of the delegated prefix in terms of the number of valid bits; hence, if the 128-bit delegated prefix field 56 specifies a hexadecimal value of "2001:0DB8::" (according to the conventions in RFC 3513) and the prefix length field 62 specifies a (decimal) value of "48", then the PDIO 18 specifies the IPv6 address prefix "2001:0DB8::/48" according to the conventions in RFC 3513.

The MDL field 64 specifies whether a minimum required delegation prefix length is required for any router that attempts to claim a prefix from the delegated prefix 56. For example, if the prefix length field 62 and the delegated prefix field 56 result in the PDIO 18 specifying the delegated address prefix "2001:0DB8::/48", the MDL field 64 can be used to ensure that any router does not attempt to claim the entire 48-bit prefix; consequently, if the MDL field 64 specifies a (decimal) value of "52", than the minimum length prefix that can be claimed by any attached router is a 52-bit prefix; if the MDL field 64 specifies a (decimal) value of "64", then the minimum length prefix that can be claimed by any attached router is a 64-bit prefix.

The delegation authorization identifier 66 specifies (e.g., using a one bit flag) whether any attached router is authorized to perform recursive prefix delegation from a claimed portion of the delegated IPv6 address prefix specified in the PDIO 18. If recursive prefix delegation is not authorized, then an attached router can only use its claimed portion of the delegated IPv6 address prefix for address autoconfiguration on its ingress links; however, if recursive prefix delegation is authorized by the DA field 66, the router can perform recursive prefix delegation and assign a subportion of its claimed address prefix to another attached router on one of its ingress links.

Although not shown in FIG. 3, the PDIO 18 also can include a timer field that identifies a valid delegation interval (e.g., one hour, 1 day, etc.,), where a timer field value of zero indicates that all delegations to the specified prefix 56 have been revoked and that prefix delegation is to be restarted. The routing circuit 28 may set the timer field value to zero, for example, in response to adding a MAC address to its ignore list, or some other administrative change.

Figure 4:
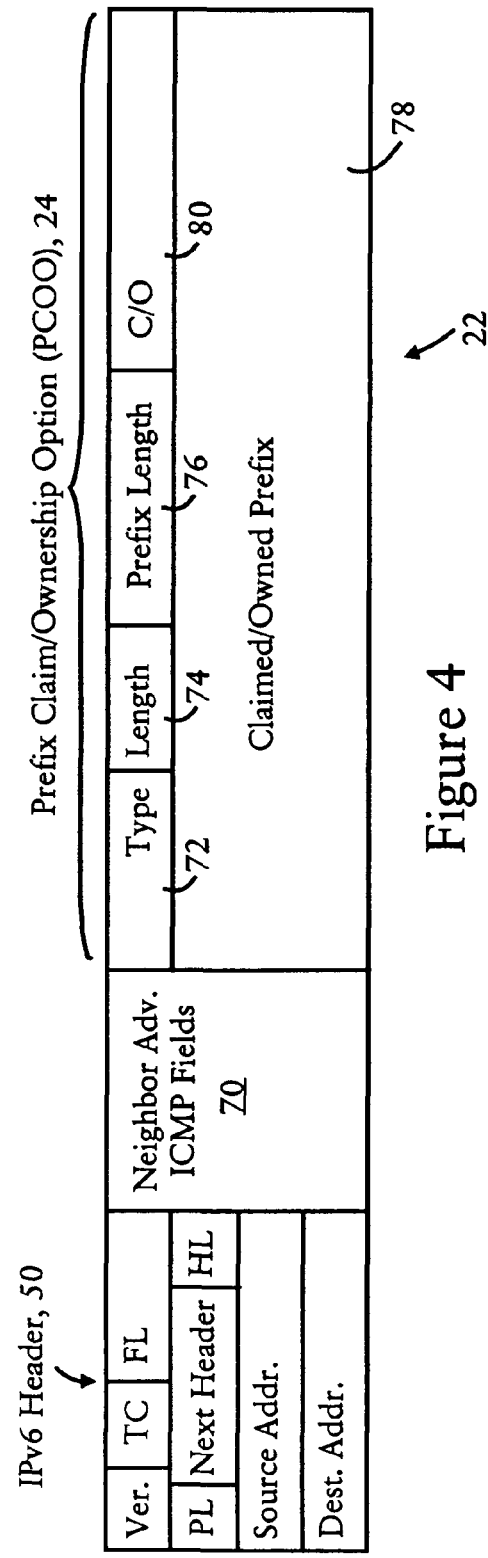
FIG. 4 illustrates an example neighbor advertisement message generated by one of the routers of FIG. 1 and having an example prefix claim/ownership option specifying a claimed or owned address prefix, according to an example embodiment.

FIG. 4 is a diagram illustrating an example neighbor advertisement message 22 generated by the routing circuit 28 according to an example embodiment. The neighbor advertisement message 22 includes the IPv6 header 50, a neighbor advertisement header 70 specifying ICMP fields according to RFC 2461, and the prefix claim/ownership option (PCOO) 24. The PCOO 24 includes a type field 72 identifying the option 24 as a prefix claim/ownership option, and option length field 74 specifying the length of the option 24, a prefix length field 76 specifying the length (i.e., the number of valid bits) of the prefix specified in the 128-bit prefix field 78, and a claimed/owned (C/O) field (e.g., a one-bit flag) 80. The C/O field 80 specifies whether the prefix specified in the PCOO 24 is claimed by the router 12 identified by the source address field in the IPv6 header 50, or whether the prefix is owned by the router. In particular, if the C/O field 80 specifies that the prefix specified in the PCOO 24 is owned by the router having output the neighbor advertisement message 22, the other routers will abandon any attempt to claim that prefix; however, if the C/O field 80 specifies that the prefix is not owned by the router but rather is "claimed" by the router, then another router can assert ownership by generating and outputting a conflicting neighbor advertisement message, for example based on a prescribed arbitration schemes where the other router has previously output a neighbor advertisement message specifying the same prefix.

Hence, routers can use the PCOO 24 to send a query to other routers in order to determine whether any of the other routers have attempted to claim the specified prefix based on setting the C/O field 80 to "claimed" status; similarly, routers can use the PCOO 24 to defend ownership of the specified prefix by setting the C/O field 82 "owned" status.

Figure 5:
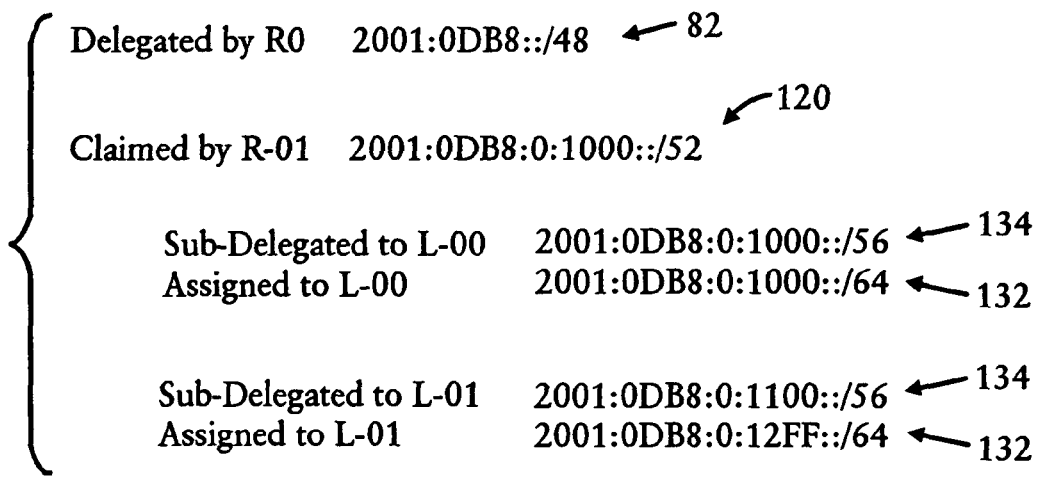
FIG. 5 illustrates an example address prefix claimed by a router for assignment and sub-delegation on ingress links based on a delegated address prefix by an attachment router, according to an example embodiment.
Figure 6:
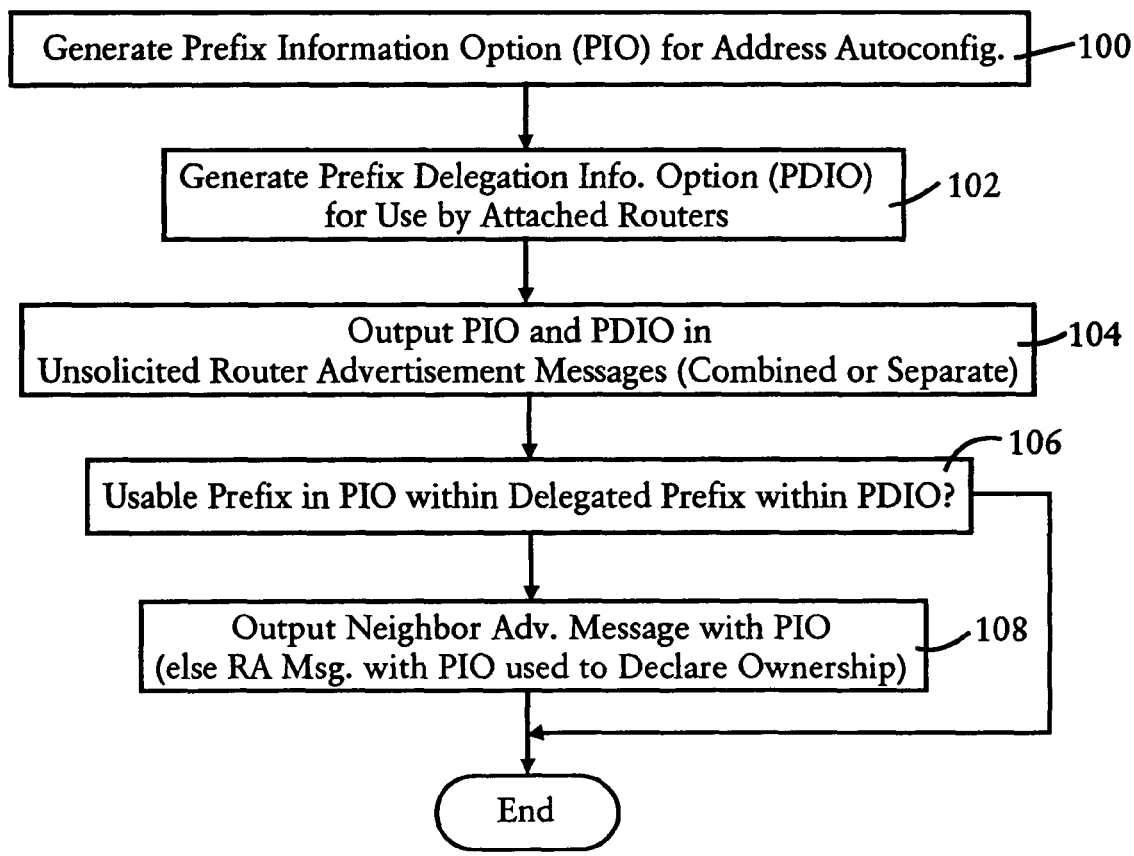
FIG. 6 illustrates an example method by an attachment router that delegates an address prefix, according to an example embodiment.
Figure 7A:
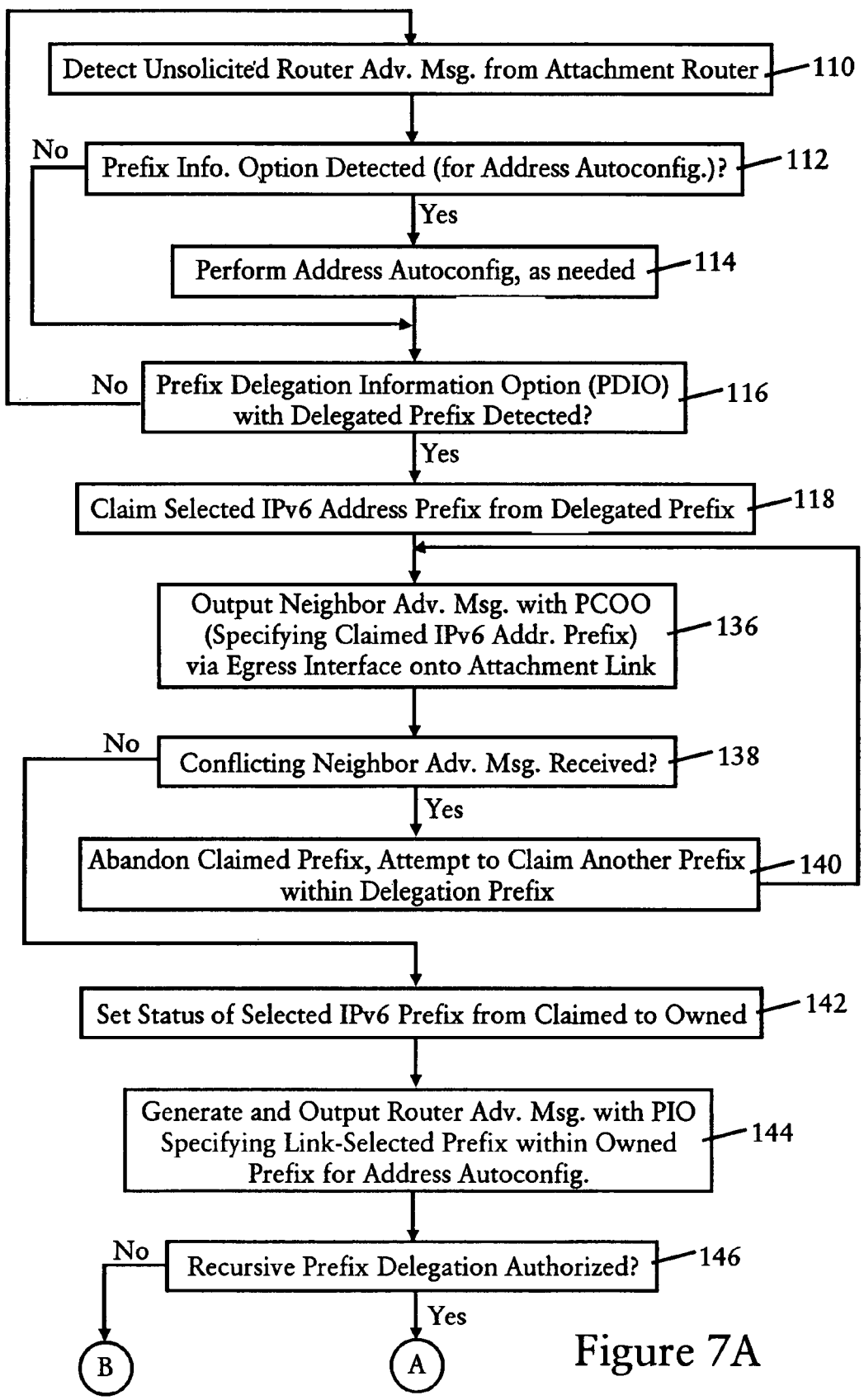
FIGS. 7A, 7B, and 7C illustrate an example method by an attached router that receives unsolicited delegated address prefixes from an attachment router, according to an example embodiment.
Figure 7B:
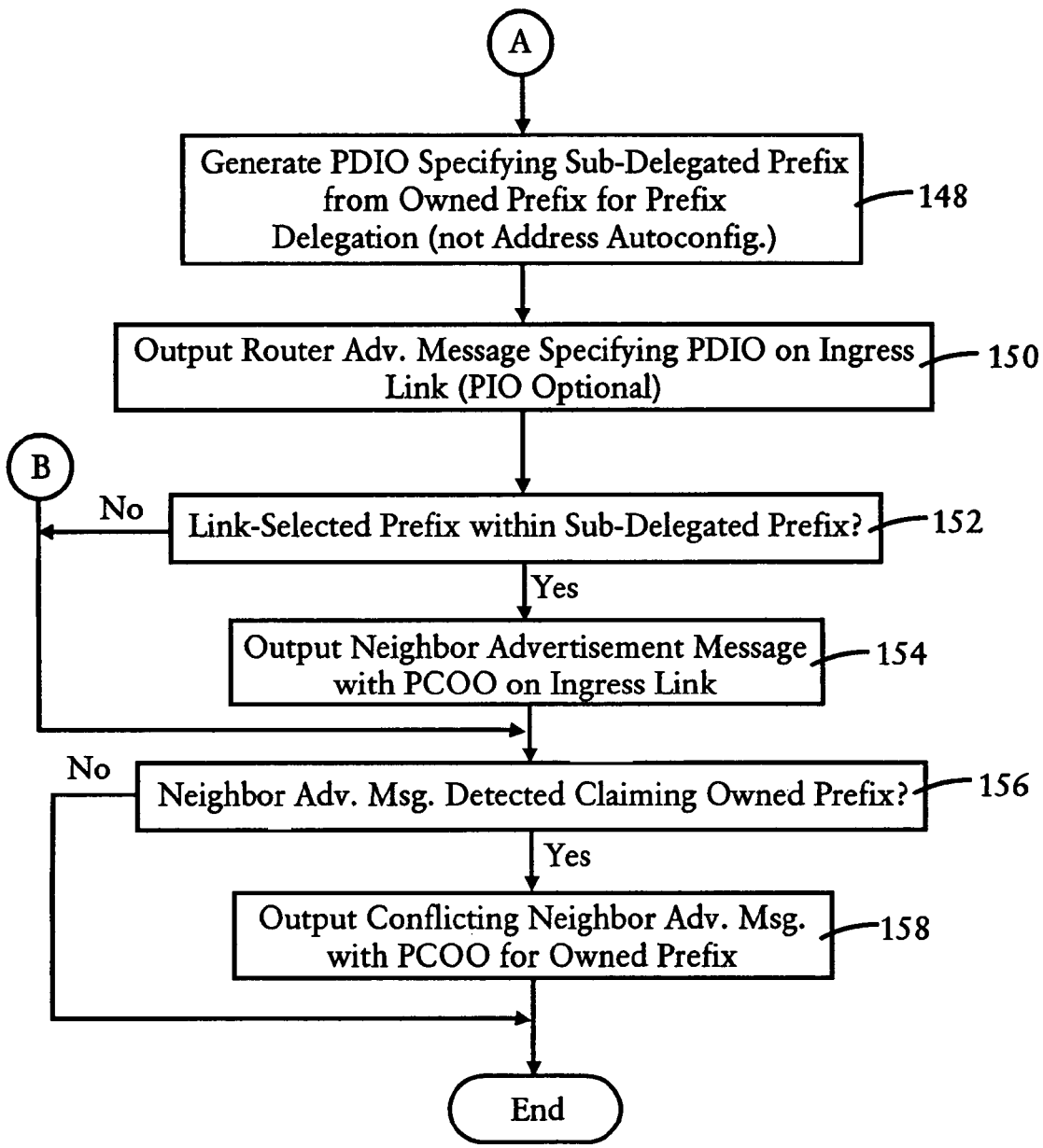
Figure 7C:
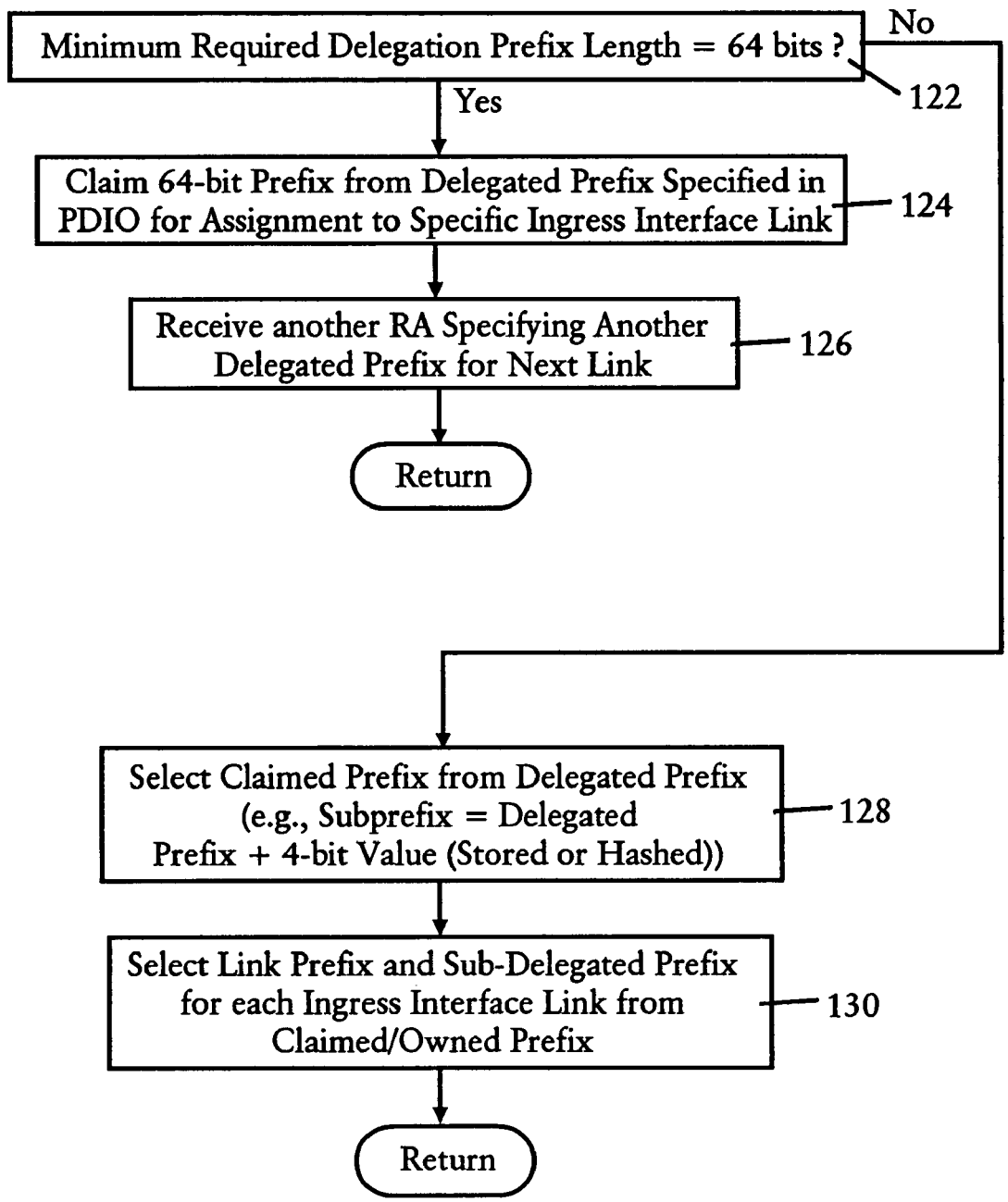

FIG. 5 is a diagram illustrating an example use by an attached router (e.g., "R-01") of a delegated IPv6 address prefix 82 having been advertised by an attachment router (e.g., "R0") on an attachment link of the attached router (e.g., "L0" 20b) according to an example embodiment. FIG. 6 is a diagram illustrating an example method by an attachment router (e.g., "R0") according to an example embodiment. FIGS. 7A, 7B, and 7C are diagrams summarizing an example method by an attached router (e.g., "R-01") according to an example embodiment. The steps described in FIGS. 6, 7A, 7B, and 8 can be implemented as executable code stored on a computer readable medium (e.g., floppy disk, hard disk, EEPROM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

As illustrated in FIG. 6, the routing circuit 28 of the attachment router (e.g., "R0") generates in step 100 a prefix information option (PIO) 16 to be used by attached routers (e.g., "R-00" and "R-01") for address autoconfiguration as described in RFC 2461. The routing circuit 28 of the attachment router (e.g., "R0") generates in step 102 the prefix delegation information option (PDIO) 18, illustrated in FIG. 3, for use by the attached routers (e.g., "R-00" and "R-01"). For example, assume that the routing circuit 28 of the attachment router specifies within the PDIO 18 the delegated IPv6 address prefix "2001:0DB8::/48" 82, and that the routing circuit 28 also sets the delegation authorization (DA) field 66 to specify that recursive delegation by attached routers is authorized. The routing circuit 28 of the attachment router (e.g., "R0") outputs in step 104 via its ingress interface circuit 34 at least one unsolicited router advertisement message onto its ingress link (e.g., 20b) and that specifies the prefix information option 16 and the prefix delegation information option 18; as illustrated in FIG. 1, the options 16 and 18 also can be output in the respective unsolicited router advertisement messages (e.g., 14a and 14b).

As described below with respect to FIG. 7B, if in step 106 the routing circuit 28 determines that the usable address prefix specified in the prefix information option 16 is within the delegated prefix 82 specified in the prefix delegation information option 18, the routing circuit 28 can output in step 108 a neighbor advertisement message 22 that defends the prefix specified in the prefix information option 16 of the transmitted router advertisement message; alternately, the attached routers can be configured to interpret any prefix information option 16 is inherently defending the specified address prefix, eliminating the necessity of the attachment router outputting the neighbor advertisement message 22 on its ingress link.

Referring to FIG. 7A, each attached router (e.g., "R-01") on the attachment link (e.g., "L0" 20*b*) provided by the attachment router (e.g., "R0") detects in step 110 the unsolicited router advertisement message (e.g., 14*a* and/or 14*b*) that is received on its egress interface circuit 32. Continuing with the example of the attached router "R-01", the routing circuit 28 determines in step 112 whether a prefix information option (PIO) 16 is detected for address autoconfiguration; if a PIO 16 is detected, the routing circuit 28 performs autoconfiguration as needed in step 114, for example as described in RFC 2461 by assigning a default attachment address and storing its default attachment address in the memory circuit 30 (e.g., within the routing table 36) or the egress interface circuit 32.

The routing circuit 28 also determines in step 116 whether the prefix delegation information option (PDIO) 18 specifying a delegated IPv6 address prefix 82 (illustrated, for example in FIG. 5) is detected from the received router advertisement message (e.g., 14*b*). Assuming the prefix delegation information option 18 is detected, the routing circuit 28 claims in step 118 a selected IPv6 address prefix 120, illustrated in FIG. 5. It should be apparent that the selected IPv6 address prefix 120 illustrated in FIG. 5 serves only as an example, since IPv6 address prefixes can be chosen from the delegated IPv6 address prefix (e.g., 82 of FIG. 5) specified in the PDIO 18. For example, FIG. 7C illustrates example implementations of step 118 of FIG. 7A, where different prefix lengths may be chosen depending on implementation and preferences by the attachment router having transmitted the prefix delegation information option 18.

For example, the routing circuit 28 can implement step 118 of FIG. 7A to choose a selected IPv6 address prefix from the delegated prefix based on determining in step 122 of FIG. 7C whether the minimum delegated prefix length (MDL) field 64 specifies a minimum prefix length of 64 bits. For example, the attachment router "R0" can be configured to limit delegation by the attached routers on a per-link basis; in this case, if the MDL field 64 specifies a minimum prefix length of 64 bits, the routing circuit 28 of the attached router "R-01" can be configured to claim in step 124 a 64-bit prefix from the 48-bit delegated prefix (e.g., 82 of FIG. 5) for each of its ingress links (e.g., "L-00", "L-01", etc.). Alternately, the routing circuit 28 of the attached router "R-01" can be configured to claim in step 124 only one 64-bit prefix for a corresponding ingress link, for example if both the prefix length 62 and the MDL field 64 specify a 64-bit prefix length, at which point the routing circuit 28 can wait to receive in step 126 another router advertisement specifying another delegated prefix for the next link.

An alternative implementation by the routing circuit 28 of selecting an IPv6 address prefix from the delegated IPv6 address prefix 82 is disclosed in step 128 and 130, where the routing circuit 28 can choose in step 128 a selected IPv6 address prefix 120 based on appending the specified 48-bit delegated prefix 82 with either a prescribed stored value in the suffix selection memory circuit 38, or a suffix generated based on applying hash keys stored in the suffix selection memory circuit 38 to the delegated prefix 82. As described below with respect to FIG. 7C, the routing circuit 28 also can select in step 130 each link prefix 132 and each subdelegated prefix 134 from the selected prefix 120 upon having established ownership of the selected prefix 120. Another alternative implementation by the routing circuit 28 can involve the routing circuit 28 dynamically selecting the prefix length based on the number of active ingress links, for example, if the attached router has only two active ingress links, the routing circuit 28 can decide that only two 64-bit prefixes are needed, and therefore can choose to claim a single 63-bit prefix, wherein the two 64-bit prefixes are within the range of the 63-bit prefix.

Referring back to FIG. 7A, the routing circuit 28 of the attached router (e.g., "R-01") stores the selected router prefix (e.g., 120 of FIG. 5) in the router prefix register 40, and generates and outputs in step 136 onto its egress link (i.e., "attachment link") (e.g., 20*b*) via its egress interface circuit 32 a neighbor advertisement message ("NA1" of FIG. 1) 22 specifying the claimed IPv6 address prefix 120 (specified in the PCOO 24) is being claimed by the router ("R-01") as identified by its IPv6 address specified in the source address field of the IPv6 header 50. The routing circuit 28 determines in step 138 whether a conflicting neighbor advertisement message 22 that claims ownership of the same IPv6 address is received via its egress interface circuit 32 within a prescribed time interval: if a conflicting neighbor advertisement message 22 is detected within the prescribed time interval from a network node that is not on the "ignore list" specified by the attachment router, the routing circuit 28 abandons in step 140 the claimed prefix that is stored in the router prefix entry 40, and attempts to claim another prefix that is within the delegation prefix 82.

If, however, the routing circuit 28 determines in step 138 that no conflicting neighbor advertisement message has been received within the prescribed time interval, the routing circuit 28 sets in step 142 the status of the selected IPv6 address from "claimed" to "owned" in the C/O field 42. The routing circuit 28, upon having established ownership of the selected IPv6 address 120, assigns link-selected address prefixes 132 within the owned prefix 120 to respective ingress links (e.g., 20*b*, 20*c*), and generates (and outputs) in step 144 respective router advertisement messages (e.g., 14*c*, 14*d*) that specify the respective link-selected prefixes 132 within the owned prefix 120 to be used for address autoconfiguration.

If in step 146 the routing circuit 28 determines that recursive prefix delegation is authorized based on the delegation authorization bit 66 in the PDIO 18, the routing circuit 28 initiates recursive prefix delegation as illustrated in FIG. 7B. In particular, the routing circuit 28 generates in step 148 a new prefix delegation information option 18 specifying a subdelegated prefix 134 that is delegated to a corresponding link for prefix delegation (as opposed to address autoconfiguration). For example, FIGS. 1 and 5 illustrate that the routing circuit 28 generates, for output onto the ingress link "L-00", the router advertisement message 14*c* specifying in the PDIO 18 that the sub-delegated IPv6 address prefix "2001:0 DB8: 0:1000::/56" 134 is sub-delegated to the ingress link "L-00" 20*b*; and that the routing circuit 28 generates, for output onto the ingress link "L-01", the router advertisement message 14*d* specifying in the PDIO 18 that the sub-delegated IPv6 address prefix "2001:0 DB8:0:1100::/56" 134 is sub-delegated to the ingress link "L-01" 20*c*. The routing circuit 28 outputs in step 150 the router advertisement message specifying the PDIO 28 on the corresponding ingress link via its ingress interface circuit 34. As illustrated in FIG. 1, the prefix information option (PIO) 16 and the prefix delegation information option (PDIO) 18 can be inserted within the same router advertisement message (e.g., 14c, 14d), or transmitted separately in distinct router advertisement messages (e.g., 14a, 14b).

As described previously, if in step 152 the link-selected prefix 132 is within the address range of the sub-delegated prefix 134, as illustrated in FIG. 5 with respect to the prefixes 132 and 134 reserved for the ingress link "L-00" 20b, the routing circuit 28 can output in step 154 a neighbor advertisement message 22 on its ingress link (e.g., 20b) specifying that the assigned prefix 132 is owned by the router "R-01" 12; alternately, the router advertisement message specifying the PIO 14 can be used to claim ownership of the assigned link prefix 132.

If the routing circuit 28 detects in step 156 a neighbor advertisement message received via either its egress interface circuit 32 or its ingress interface circuit 34 and that claims any owned prefix (e.g., a prefix owned for one of its ingress links), the routing circuit 28 will output in step 158 a conflicting neighbor advertisement message with the prefix claim/ownership option (PCOO) 24 to assert its owned prefix, assuming the delegation interval has not expired as specified in the timer field of the router advertisement message 14. As apparent from the foregoing, if the delegation interval has expired, the attached network nodes will await new valid router advertisement messages 14 and restart the above-described procedures.

As illustrated herein, the example embodiments enable autonomous prefix delegation without the necessity of stateful services such as DHCP.

What is claimed is:

1. A method comprising:
    detecting, by a router, an unsolicited first router advertisement message from an attachment router that provides an attachment link used by the router, the first router advertisement message specifying a first IPv6 address prefix owned by the attachment router and usable for address autoconfiguration on the attachment link;
    detecting, by the router, an unsolicited delegated IPv6 address prefix from the attachment router and that is available for use by the router; and
    claiming by the router a second IPv6 address prefix from at least a portion of the delegated IPv6 address prefix, for use on at least one ingress link of the router, wherein the claiming includes outputting onto the attachment link a neighbor advertisement message having a prefix option field specifying one of ownership or attempted ownership of the second IPv6 address prefix.

2. The method of claim 1, wherein the claiming further includes changing a status of the second IPv6 address prefix from the attempted ownership to the ownership in response to a determined absence on the attachment link of any conflicting neighbor advertisement message specifying ownership of the second IPv6 address prefix within a prescribed interval.

3. The method of claim 1, wherein the claiming further includes abandoning the second IPv6 address prefix, and claiming a third IPv6 address prefix from the delegated IPv6 address prefix and that is distinct from the second IPv6 address prefix, in response to detecting on the attachment link a conflicting neighbor advertisement message specifying ownership of the second IPv6 address prefix within a prescribed interval.

4. The method of claim 1, wherein the claiming includes selecting the second IPv6 address prefix according to a prescribed selection criterion stored in the router.

5. The method of claim 1, further comprising:
    outputting by the router a second router advertisement message onto the at least one ingress link, the second router advertisement message specifying the second IPv6 address prefix for use in address autoconfiguration on the at least one ingress link; and
    outputting by the router onto the at least one ingress link that a second delegated IPv6 address prefix from the delegated IPv6 address prefix is available for use by any router on the at least one ingress link, in response to the router detecting an identifier authorizing recursive prefix delegation from the second IPv6 address prefix.

6. The method of claim 5, wherein the second IPv6 address prefix is within the second delegated IPv6 address prefix, the method further comprising outputting by the router onto the at least one ingress link a neighbor advertisement message having a prefix option field specifying the second IPv6 address prefix is owned by the router.

7. The method of claim 1, wherein the router provides a plurality of the ingress links and the second IPv6 address prefix is a portion of the delegated IPv6 address prefix, the method further comprising:
    assigning to each of the ingress links a corresponding portion of the second IPv6 address prefix based on outputting on the corresponding ingress link a corresponding router advertisement message specifying the corresponding portion of the second IPv6 address prefix available for address autoconfiguration.

8. The method of claim 7, wherein the claiming further includes selecting by the router a prefix length of the second IPv6 address prefix, relative to the delegated IPv6 address prefix, based on a number of the ingress links provided by the router.

9. The method of claim 1, wherein the delegated IPv6 address prefix is detected by the router in one of the first router advertisement message or a second router advertisement message from the attachment router and that does not specify the first IPv6 address usable for address autoconfiguration.

10. The method of claim 1, wherein the claiming includes selecting a prefix length of the second IPv6 address prefix based on a minimum required delegation prefix length specified by the attachment router for the delegated IPv6 address prefix.

11. The method of claim 1, wherein the second IPv6 address prefix equals the delegated IPv6 address prefix, the method further comprising:
    detecting a second unsolicited delegated IPv6 address prefix from the attachment router and that is available for use by the router;
    claiming by the router the second unsolicited delegated IPv6 address for use on a second ingress link of the router.

12. A method comprising:
    generating, by a router, an unsolicited router advertisement message having a prefix delegation information option field, the prefix delegation information option field specifying a delegated IPv6 address prefix having a specified prefix length, enabling at least a portion of the delegated IPv6 address prefix to be used by attached routers that are attached to the router via an ingress link provided by the router; and
    outputting, by router, the unsolicited router advertisement message onto the ingress link for use by the attached routers.

13. The method of claim 12, wherein the prefix delegation information option field includes an identifier authorizing recursive prefix delegation of the at least a portion of the delegated IPv6 address prefix by any of the attached routers.

14. The method of claim 13, further comprising:
generating and outputting by the router a prefix information option field that specifies a first IPv6 address prefix to be used for address autoconfiguration on the ingress link;
generating and outputting by the router the prefix information option field onto the ingress link based on inserting the prefix information option field into at least one of the unsolicited router advertisement message having the prefix delegation information option field, or a second router advertisement message output by the router onto the ingress link and that does not specify the prefix delegation information option field.

15. The method of claim 14, wherein the first IPv6 address prefix is within the delegated IPv6 address prefix, the method further comprising generating and outputting by the router a neighbor advertisement message having a prefix option field specifying the first IPv6 address prefix is owned by the router.

16. The method of claim 14, wherein the first IPv6 address prefix is within the delegated IPv6 address prefix, the prefix information option field specifying that the router owns the first IPv6 address prefix.

17. The method of claim 12, wherein the prefix delegation information option field specifies a minimum required delegation prefix length to be used by the attached routers in using the at least a portion of the delegated IPv6 address prefix.

18. The method of claim 12, wherein the prefix delegation information option field includes an identifier specifying that the delegated IPv6 address prefix is to be used for IPv6 address prefix delegation, and not autonomous address configuration.

19. An apparatus comprising:
a network interface circuit configured for connecting to an attachment link and receiving an unsolicited first router advertisement message from an attachment router that provides the attachment link, the first router advertisement message specifying a first IPv6 address prefix owned by the attachment router and usable for address autoconfiguration on the attachment link, the network interface circuit further configured for providing at least one ingress link for attached network nodes; and
a routing circuit configured for detecting an unsolicited delegated IPv6 address prefix received by the network interface circuit from the attachment router and that is available for use by the routing circuit, the routing circuit configured for claiming a second IPv6 address prefix from at least a portion of the delegated IPv6 address prefix, for use on the at least one ingress link, wherein the routing circuit is configured for generating, for output by the network interface circuit onto the attachment link, a neighbor advertisement message having a prefix option field specifying one of ownership or attempted ownership of the second IPv6 address prefix, the routing circuit including integrated circuitry.

20. The apparatus of claim 19, further comprising a memory circuit configured for storing a status of the second IPv6 address prefix, the routing circuit configured for changing the status of the second IPv6 address prefix from the attempted ownership to the ownership in response to a determined absence on the attachment link of any conflicting neighbor advertisement message specifying ownership of the second IPv6 address prefix within a prescribed interval.

21. The apparatus of claim 19, wherein the routing circuit is configured for abandoning the second IPv6 address prefix, and claiming a third IPv6 address prefix from the delegated IPv6 address prefix and that is distinct from the second IPv6 address prefix, in response to receiving from the attachment link a conflicting neighbor advertisement message specifying ownership of the second IPv6 address prefix within a prescribed interval.

22. The apparatus of claim 19, further comprising a memory circuit configured for storing a prescribed selection criterion for delegated address prefixes, the routing circuit configured for selecting the second IPv6 address prefix according to the prescribed selection criterion.

23. The apparatus of claim 19, wherein:
the routing circuit is configured for generating, for output by the network interface circuit onto the at least one ingress link, a second router advertisement message specifying the second IPv6 address prefix for use in address autoconfiguration on the at least one ingress link;
the routing circuit is configured for generating, for output by the network interface circuit onto the at least one ingress link, an unsolicited prefix delegation information option field specifying that a second delegated IPv6 address prefix from the delegated IPv6 address prefix is available for use by any router on the at least one ingress link, in response to the routing circuit detecting an identifier authorizing recursive prefix delegation from the second IPv6 address prefix.

24. The apparatus of claim 23, wherein the second IPv6 address prefix is within the second delegated IPv6 address prefix, the routing circuit configured for generating, for output by the network interface circuit onto the at least one ingress link, a neighbor advertisement message having a prefix option field specifying the second IPv6 address prefix is owned by the apparatus.

25. The apparatus of claim 19, wherein:
the network interface circuit provides a plurality of the ingress links and the routing circuit is configured for claiming a portion of the delegated IPv6 address prefix as the second IPv6 address prefix:
the routing circuit configured for assigning to each of the ingress links a corresponding portion of the second IPv6 address prefix based on generating, for output by the network interface circuit onto the corresponding ingress link, a corresponding router advertisement message specifying the corresponding portion of the second IPv6 address prefix available for address autoconfiguration.

26. The apparatus of claim 25, wherein the routing circuit is configured for selecting a prefix length of the second IPv6 address prefix, relative to the delegated IPv6 address prefix, based on a number of the ingress links provided by the network interface circuit.

27. The apparatus of claim 19, wherein the delegated IPv6 address prefix is detected by the routing circuit in one of the first router advertisement message or a second router advertisement message from the attachment router and that does not specify the first IPv6 address usable for address autoconfiguration.

28. The apparatus of claim 19, wherein the routing circuit is configured for selecting a prefix length of the second IPv6 address prefix based on a minimum required delegation prefix length specified by the attachment router for the delegated IPv6 address prefix.

29. The apparatus of claim 19, wherein:
the routing circuit is configured for claiming the delegated IPv6 address prefix as the second IPv6 address prefix, the delegated IPv6 address prefix and the second IPv6 address prefix having equal lengths;
the routing circuit is configured for detecting a second unsolicited delegated IPv6 address prefix from the attachment router and that is available for use by the routing circuit, the routing circuit further configured for claiming the second unsolicited delegated IPv6 address for use on a second ingress link provided by the network interface circuit.

30. An apparatus comprising:
a routing circuit configured for generating an unsolicited router advertisement message having a prefix delegation information option field, the prefix delegation information option field specifying a delegated IPv6 address prefix having a specified prefix length, for use of at least a portion of the delegated IPv6 address prefix by attached routers that are attached on an ingress link; and
a network interface circuit configured for providing the ingress link and outputting the unsolicited router advertisement message onto the ingress link for use by the attached routers the routine circuit including integrated circuitry.

31. The apparatus of claim 30, wherein the routing circuit is configured for inserting into the prefix delegation information option field an identifier authorizing recursive prefix delegation of the at least a portion of the delegated IPv6 address prefix by any of the attached routers.

32. The apparatus of claim 31, wherein:
the routing circuit is configured for generating, for output by the network interface circuit onto the ingress link, a prefix information option field that specifies a first IPv6 address prefix to be used for address autoconfiguration on the ingress link;
the routing circuit configured for inserting the prefix information option field into at least one of the unsolicited router advertisement message having the prefix delegation information option field, or a second router advertisement message generated by the routing circuit and output onto the ingress link and that does not specify the prefix delegation information option field.

33. The apparatus of claim 32, wherein the first IPv6 address prefix is within the delegated IPv6 address prefix, the routing circuit configured for generating, for output onto the ingress link by the network interface circuit, a neighbor advertisement message having a prefix option field specifying the first IPv6 address prefix is owned by the apparatus.

34. The apparatus of claim 32, wherein the first IPv6 address prefix is within the delegated IPv6 address prefix, the prefix information option field specifying that the apparatus owns the first IPv6 address prefix.

35. The apparatus of claim 30, wherein the routing circuit is configured for inserting into the prefix delegation information option field a minimum required delegation prefix length to be used by the attached routers in using the at least a portion of the delegated IPv6 address prefix.

36. The apparatus of claim 30, wherein the routing circuit is configured for inserting into the prefix delegation information option field an identifier specifying that the delegated IPv6 address prefix is to be used for IPv6 address prefix delegation, and not autonomous address configuration.

37. An apparatus comprising:
means for connecting to an attachment link and receiving an unsolicited first router advertisement message from an attachment router that provides the attachment link, the first router advertisement message specifying a first IPv6 address prefix owned by the attachment router and usable for address autoconfiguration on the attachment link, the means for connecting further configured for providing at least one ingress link for attached network nodes; and
means for detecting an unsolicited delegated IPv6 address prefix received by the means for connecting from the attachment router and that is available for use by the apparatus, the means for detecting configured for claiming a second IPv6 address prefix from at least a portion of the delegated IPv6 address prefix, for use on the at least one ingress link, wherein the means for detecting is configured for generating, for output by the means for connecting onto the attachment link, a neighbor advertisement message having a prefix option field specifying one of ownership or attempted ownership of the second IPv6 address prefix.

38. An apparatus comprising:
means for generating an unsolicited router advertisement message having a prefix delegation information option field, the prefix delegation information option field specifying a delegated IPv6 address prefix having a specified prefix length, for use of at least a portion of the delegated IPv6 address prefix by attached routers that are attached on an ingress link; and
means for providing the ingress link and outputting the unsolicited router advertisement message onto the ingress link for use by the attached routers.

39. The apparatus of claim 38, wherein the means for generating is configured for inserting into the prefix delegation information option field an identifier authorizing recursive prefix delegation of the at least a portion of the delegated IPv6 address prefix by any of the attached routers.

40. The apparatus of claim 38, wherein the means for generating is configured for inserting into the prefix delegation information option field an identifier specifying that the delegated IPv6 address prefix is to be used for IPv6 address prefix delegation, and not autonomous address configuration.

* * * * *